United States Patent [19]

Ashley

[11] Patent Number: 4,991,563
[45] Date of Patent: Feb. 12, 1991

[54] APPARATUS AND METHOD FOR HEATING HOLLOW BOLTS

[76] Inventor: Royce C. Ashley, P.O. Box 10, Deer Park, Tex. 77536

[21] Appl. No.: 362,053

[22] Filed: Jun. 6, 1989

[51] Int. Cl.[5] .......................... F24C 3/02; B23P 11/02
[52] U.S. Cl. .................................... 126/401; 126/226; 411/395; 411/916; 29/447
[58] Field of Search ................ 126/226, 401; 411/395, 411/916; 29/447

[56] References Cited

U.S. PATENT DOCUMENTS

| | | | |
|---|---|---|---|
| 1,149,518 | 8/1915 | Holmes | 29/447 |
| 1,199,541 | 9/1916 | Furber | 29/447 |
| 1,955,728 | 4/1934 | Allen et al. | 29/447 |
| 1,980,156 | 11/1934 | Emrich | 29/447 |
| 2,359,046 | 9/1944 | Miller | 411/395 |
| 3,724,059 | 4/1973 | Zelovsby | 29/447 |

Primary Examiner—Albert W. Davis, Jr.
Attorney, Agent, or Firm—Dodge Bush & Moseley

[57] ABSTRACT

An apparatus and method for heating hollow bolts (20) mounted in aligned openings (18) of a pair of members (10,12) to be connected together. A conduit (42) supported by a cylindrical body (40) from the end (29) of the bolt (20) is inserted within the bore (34) of the bolt (20). A fired stream of heated fluid from a gas torch (90) flows through the conduit (42) thereby to heat the bolt (20) for providing sufficient elongation for predetermined tightening or loosening of the associated nut (30). One embodiment (FIG. 1) utilizes a hollow bolt having a blind end central bore (34). Another embodiment (FIG. 3) utilizes a hollow bolt (26A) having a central bore (34A) extending through the entire length of the bolt (26A).

4 Claims, 1 Drawing Sheet

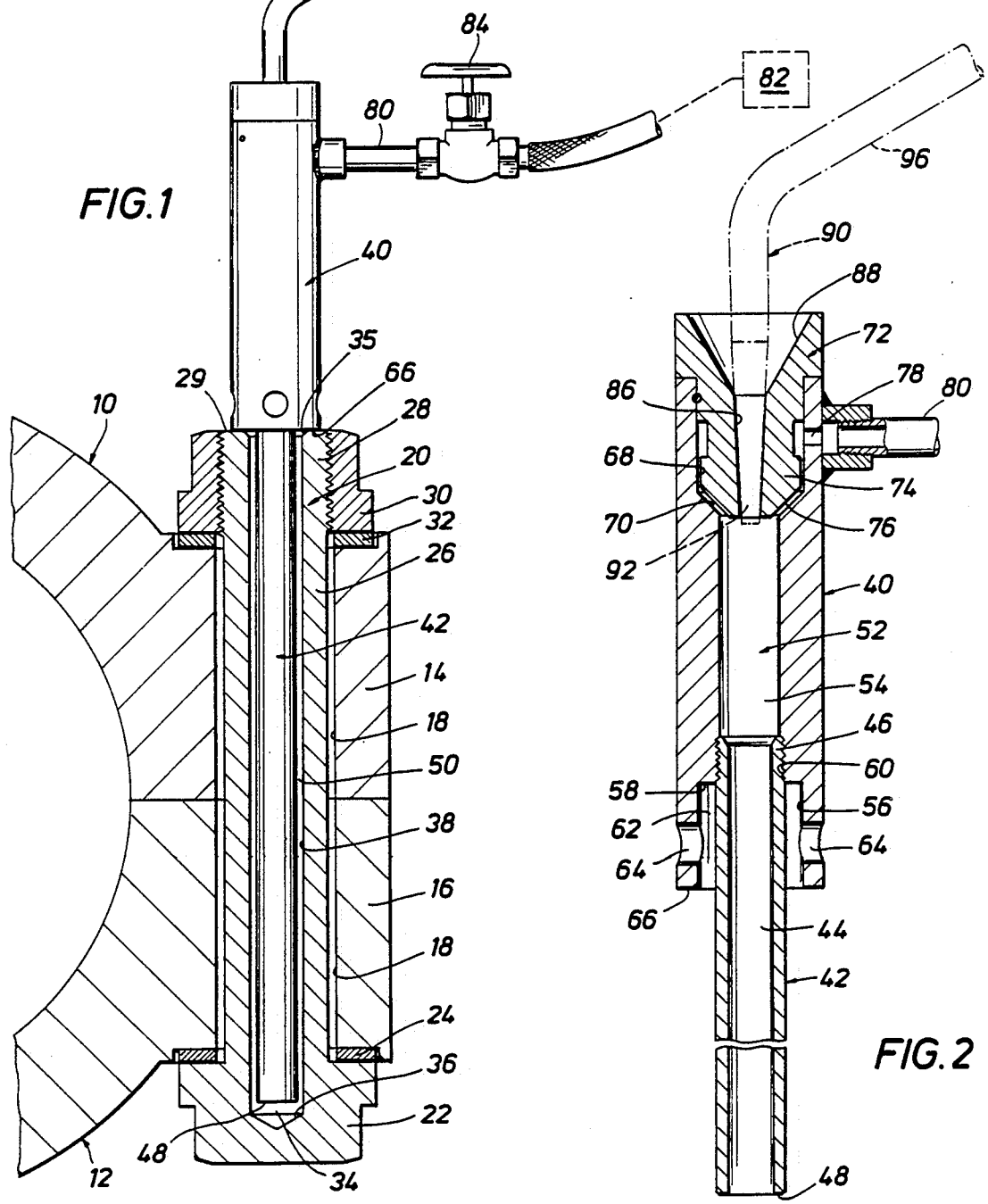

APPARATUS AND METHOD FOR HEATING HOLLOW BOLTS

BACKGROUND OF THE INVENTION

This invention relates to an apparatus and method for heating or thermally stretching bolts, and more particularly to such an apparatus and method for heating hollow bolts while the bolts are operably mounted to enable their proper installation or removal.

Heretofore, it has been common practice, when using conventional helically threaded bolting means for fixedly securing mating flanges or portions of members to be connected, to thermally stretch or elongate the hollow bolts prior to rotatably tightening the associated conventional nut means to provide a predetermined tension preload while minimizing the application of rotational force to the nuts. In releasing such made up bolting means, the thermal stretch or elongation is also employed so the bolting means will grow or lengthen sufficiently to enable the associated nut means to be rotatably loosened with less force. In order to heat the bolts in a minimum of time, the bolts have been provided heretofore with internal bores and suitable heating means have been inserted within the internal bore for heating the bolts.

Referring, for example, to U.S. Pat. No. 2,176,601 dated Oct. 17, 1939 an electrical resistance heating element is inserted within the internal bore of a bolt to heat the bolt with the bolt forming a part of the electrical circuit. Also, U.S. Pat. No. 1,682,338 dated Aug. 28, 1928, and U.S. Pat. No. 2,359,046 dated Sept. 26, 1944, both disclose a heating element inserted within a bore in a bolt for heating the bolt prior to tightening the nut onto the bolt. In general, electrical heating is slow and requires an excessive amount of time to tighten or loosen the plurality of bolt means employed to secure an item of equipment.

In U.S. Pat. No. 2,320,398 dated Jun. 1, 1943, an arrangement is shown for cooling bolts after being heated by the circulation of a cooling fluid or medium about the bolts. However, there is no suggestion of using a circulating fluid for heating the bolts prior to tightening of nuts thereon.

SUMMARY OF THE INVENTION

The present invention is directed to an apparatus and method utilizing a circulating heat transfer fluid medium for heating hollow bolting prior to tightening or releasing of the associated nut means thereon. A tubular member is inserted within a open end of the open bore in the bolt. In the event the other end of the bolt bore is closed, the apparatus terminates adjacent the bottom of the bore to define an annular space between the tubular member and the bolt. A conventional heating torch is used to supply a heated fluid stream which flows through the tubular apparatus in one direction toward the closed end of the internal bore of the hollow bolting, and is then deflected by the end closure for flow in an opposite direction through the annular space between the tubular conduit of the apparatus and the wall of the hollow bolt. In the event the bolt means is open on both ends the heated fluid simply exits the tubular apparatus and hollow bolt on the other end. Thus, the hollow threaded bolt means is heated in a minimum of time by either or both radiation from the heated conduit and by convection from the heated fluid flowing along the surface of the internal bore of the bolt.

The tubular heating apparatus includes a supporting body comprising a generally cylindrical body means with a central bore extending therethrough communicating with the bore of a tubular extension or conduit which fits in abutting relation against the extended open end of the hollow bolt with the bores of the body and bolt being in substantial concentric or axial alignment with the longitudinal axis of the conduit.

A conventional high thermal output gas torch utilizing a combustible gas, such as natural gas or an oxy-acetylene, is fired to provide the source of thermal energy or heat. The heated stream of gas discharged from the conventional nipple or burning tip is received or positioned within the supporting body and in axial alignment with the bore for discharge through the bore of the attached conduit to heat the bolt. Another stream of fluid, usually and preferably compressed air, is introduced by the supporting body that mixes or combines with the heated fluid stream from the burner tip. The combined heated fluid stream is vented to atmosphere upon leaving the internal bore of the bolt.

It is an object of this invention to provide an apparatus and method for heating hollow threaded member, such as a stud or bolt with a heated fluid stream provided in the internal bore of the bolt.

It is a further object of this invention to provide such an apparatus and method in which a tubular member is inserted within the internal bore of the bolt and heated fluid flows through the tubular member into the bore of the bolt for heating the bolt.

An additional object of this invention is to provide such an apparatus and method in which the bolt is heated by a fired combustible fluid by either or both radiation from the tubular member within the bore of the bolt and convection from the flowing fluid stream along the inner surface of the bolt.

Another object of this invention is to provide means for supporting the tubular member from the extending end of the hollow bolt to provide easy access to the internal bore of the bolt.

Other objects, features, and advantages of this invention well become more apparent after referring to the following specifications and drawings.

DESCRIPTION OF THE INVENTION

FIG. 1 is a longitudinal sectional view of one form of a typical hollow helically threaded bolt and associated nut means with the apparatus of the present invention for heating or thermally elongating the bolt shown in elevation;

FIG. 2 is a side view, in section, of the apparatus of the present invention for heating or thermally elongating the hollow bolt; and FIG. 3 is a partial longitudinal section view of another embodiment of a hollow threaded bolt with the apparatus of the present invention.

DESCRIPTION OF THE PREFERRED EMBODIMENT

Referring now to the drawings for a better understanding of this invention, a pair of equipment members partially shown at 10 and 12 have mating portions or flanges 14 and 16 with aligned openings 18 therethrough. Preferably, but not necessarily, the members 10 and 12 are mating portions of an item of equipment that operates at high temperature such as a turbine.

For securing flanges 14 and 16 in a tightly compressed relation under a predetermined compressive loading, a conventional bolt means, indicated generally at 20 is received within aligned openings 18. In the illustrated embodiment of FIG. 1, bolt means 20 has an integral fixed bolt head 22 at one end in abutting relation with a washer 24 in contact with flange 16, and a main body 26 having an externally threaded end portion 28 extending outwardly from adjacent flange 14 to define an outer end surface 29.

A separate internally threaded nut means 30 having a plurality of equi-circumferentially arranged wrench securing flats is threaded onto end portion 28 in abutting relation to washer 32 adjacent the flange 14 or to the flange itself. While head 22 is shown integral with body 26, a separate conventional nut means similar to 30 could be threaded onto the bolt means 20 to provide a lower head corresponding to integral bolt head 22, if desired. In that event, the heated fluid is simply discharged from the other end of the bolt means 20. Bolt 20 has a concentric internal bore 34 with an end opening 35 and defines a bottom 36 and an inner peripheral wall surface 38. Bore 34 extends substantially the entire length of bolt 26 to head 22 and, if desired, may be open on both ends to provide a straight through bore as illustrated in FIG. 3.

The apparatus generally designated A, for heating or thermally expanding threaded bolt means 20 is shown in elevation separately in FIG. 2 and in FIG. 1 is operably positioned for heating or thermally elongating the bolt means 20. The apparatus A includes a central cylindrical support body, generally indicated at 40, mounting or supporting a downwardly extending outlet tubular conduit or piping generally indicated at 42. The cylindrical body 40 and tubular conduit 42 are shown in section in FIG. 2 for illustrating that the tubular conduit 42 has a central bore 44 extending between an inner externally threaded end 46 and an outer end 48. Conduit 42 during operation is inserted within bore 34 of bolt 20 and outer end 48 is spaced from bottom 36 of bore 34 a predetermined relatively small distance, such as in the range of one-half inch to two (2) inches, for example, if the bolt means 20 is not opened on both ends. An annulus or annular space 50 is provided between the outer surface of conduit 42 and the inner surface 38 defining bore 34 to form a flow passage for the heated fluid as will be explained later. One purpose of the conduit 42 is to prevent direct inpingement of the heating flame on the bolt means 20 or the nut means which could adversely affect the metallurgical and physical properties of the bolt means 20.

The central tubular body 40 has a concentric integral bore therethrough indicated generally at 52 defining a small diameter intermediate bore portion 54 and an enlarged diameter end bore portion 56 separated by a shoulder 58. An end portion of small diameter bore portion 54 is internally threaded at 60 to receive the externally threaded end 46 of conduit 42 in threaded relation for removably mounting conduit 42. An annular chamber 62 is formed in enlarged end bore portion 56 between the outer surface of conduit 42 and the inner peripheral surface defining bore portion 56. Side openings 64 extend through the wall of body 40 from annular chamber 62 to atmosphere to provide a vent for hot gases from annular space 50 of bolt 20. During operation, the inner end 66 of body 40 is in abutting contact relation with the end surface 29 of bolt 20 as shown in FIG. 1.

Body 40 has an enlarged diameter outer bore portion shown at 68 with a tapered shoulder 70 formed at the juncture of enlarged bore portion 68 with small diameter bore portion 54. A fitting generally indicated at 72 is received in secured relation within enlarged bore portion 68 and has an inner end portion 74 spaced from the adjacent surface forming bore portion 68 and shoulder 70 to form a fluid passage 76 therebetween. An inlet opening 78 through the wall of body 40 is in fluid communication with a fluid supply line 80 connected to a suitable source 82 of a fluid, such as compressed air, for example, for supplying a fluid to small diameter bore portion 54 through fluid passage 76 adjacent fitting 72. A suitable control valve 84 is shown for controlling the supply of fluid to bore portion 54. Fitting 72 has a central bore therethrough defining a small diameter shaped or tapered bore portion 86 and an enlarged tapered end bore torch guiding portion 88 leading to small diameter bore portion 86 to assist in properly positioning the torch tip.

A conventional gas torch is shown partially at 90 and includes a torch body 91 and a detachable tapered inner tip 92 adapted to fit within small tapered diameter bore portion 86 as shown in FIG. 2 with the end of tip 92 projecting within the bore portion 54. A source of flammable fluid, such as acetylene or natural gas, for example, is shown at 94 and is supplied through conduit 95 to the torch body 91 and tip 92. A suitable control valve is shown at 98 to control the supply of the flammable fluid to the torch body 91. A source of oxygen for the flammable fluid, normally high pressure oxygen is shown of 94a and supplied through conduit 95a to the torch body 91. A suitable control valve 98a is used to control the supply of oxygen to the torch body 91.

Use and Operation of the Present Invention

Most machinery employs bolting in some form to fixedly secure mating operating portions or flanges. Bolting subjected to high force loading during equipment operation is usually provided with a central bore to distribute the attendant stress and strain resulting from such loading. In some applications, usually associated with equipment operating at high temperature, such as steam or gas turbines, it is often necessary to preload the bolting to compensate for the difference in operating temperature of the bolting and the ambient temperature at which the equipment is assembled. Due to the thermal growth, lengthening or elongation of the bolt member resulting from the higher operating temperature, equipment that is tightly made up at ambient temperatures will be effectively inoperable at elevated temperature. This is compensated for in design and installation by preloading the bolt member. This preloading results in the proper tightness at operating temperatures, but requires the bolt to be over tightened at ambient temperatures. To achieve this desired preload the built member is fully tightened at ambient temperatures. The desired preload stretch is then calculated in thousandths of an inch and the hollow bolt heated. After the bolt thermally elongates, the bolt is further tightened a predetermined amount to induce the preload. For example, assuming an 8 pitch (threads per inch) bolt and a nut with 6 flats (60° arc per flat), rotation of the nut will elongate or preload the bolt 1/6 of 0.125 in. or 0.021 of an inch. If a preload bolt elongation of 0.042 in. is desired the nut is rotated two flats and so forth.

In operation, gas torch 90 is ignited or fired prior to insertion within fitting 72. Also, a predetermined amount of compressed air fluid is supplied through line 80 to bore portion 54 for mixing with the torch output to diffuse the concentrated heat output. Support body 40 is first positioned in abutting contact with end surface 29 of bolt 20 with conduit 42 received within bore 34. Then, the tip 92 of fired gas torch 90 is inserted within fitting 72. The fired fluid is discharged from tip 92 under a pressure of at least slightly above atmospheric and greater than that of the gas supplied through conduit 80. The fired fluid flows in one direction through conduit 42. If a closed end bolt is employed the stream of heating fluid impacts against bottom 36 of bore 34, then is deflected by bottom 36 in an opposite direction for flow along annular space 50 in contact with the adjacent peripheral surface 38 defining bore 34. Next, the heated fluid is discharged from bore 34 into annular chamber 62 for venting to atmosphere through openings 64.

Conduit 42 is heated by the fired fluid to a sufficient temperature to heat bolt 20 by radiation and additionally, a closed end bolt 20 is heated by convection as a result of the hot fluid flowing in annular space 50 along the inner peripheral surface 38 defining bore 34. Bolt 20 may be heated to a predetermined sufficient temperature and upon the reaching of such temperature, nut 30 is further tightened to sufficiently produce the desired stress or strain in bolt 20.

To release the bolts, the heating is accomplished in the same manner, but the nuts are rotated in the opposite direction to effect their removal and disassembly of the equipment.

Referring to FIG. 3, the apparatus of the present invention is utilized with another embodiment of hollow bolt means 20A which has a bore 34A extending the entire length of a bolt main body 26A having opposed threaded end portions 28A. A nut 30A is threaded onto each threaded end portion 28A. Conduit 42 extends for the entire length of bore 34A and heats body 26A primarily by radiation. The operation of the heating apparatus and the installation of bolts means 20A is similar to that of FIGS. 1 and 2.

From the above, a highly effective arrangement has been provided for heating bolts in a minimum of time to a sufficient temperature to provide the predetermined elongation. The process is applied in a simple manner with minimal steps and highly satisfactory results have been obtained. While members 10 and 12 have been shown as having mating contacting flanges, it is apparent that the present invention could be utilized for connecting members together which are in spaced relation to each other, or which do not have mating flanges.

As used herein, "nut means" shall mean any member threadedly secured to the "bolt means" and includes by way of example and not by limitation, nuts, and cap screws.

As used herein, "bolt means" shall mean any elongated threaded member to which at least one "nut means" is operably secured by rotatable makeup.

As used herein, "fluid" shall mean liquid, gases, vapors or combinations thereof.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. Apparatus for thermally expanding a hollow bolt extending through aligned openings in a pair of mating flanges, the hollow bolt having at least one nut rotatably mounted adjacent one flange, said apparatus comprising:

a generally cylindrical support body having a central bore therethrough defining a small diameter intermediate bore portion and an enlarged diameter inner end bore portion for positioning on the extending end portion of said bolt in axial alignment therewith with the bore of the body being in fluid communication with the bore of said bolt and forming a continuation thereof;

a tubular fluid transmitting and heat transfer conduit secured to said body within said enlarged diameter end bore portion and defining an annular chamber between said conduit and said body having a vent to atmosphere, said tubular conduit extending within the bore of said hollow bolt for a major portion of the length of said bolt bore and defining an annular space between the conduit and the bolt;

the outer end of said body bore adapted to receive a conventional tip of a heating torch to provide a heated fluid therein for flow in one direction through said conduit and discharge from the end of said conduit, said heated fluid and conduit heating said bolt to a predetermined high temperature whereby said bolt is tensioned a predetermined amount by rotation of a nut on said externally threaded end portion to provide a predetermined stress on said bolt.

2. Apparatus as set forth in claim 1 wherein said body includes a fitting at its outer end having a small diameter axial opening therein in longitudinal alignment with said body bore, said fitting adapted to receive the nipple of a heating torch for providing the heated fluid to said conduit and hollow bolt.

3. Apparatus as set forth in claim 2 wherein a separate side opening is provided in said body extending through the side of said body to said body bore adjacent the end of said fitting and adapted to supply a fluid to said body bore.

4. Apparatus for thermally elongating a hollow bolt extending through aligned openings in a pair of mating flanges, the hollow bolt having a nut mounted adjacent one flange and an opposed externally threaded end portion extending outwardly from the other flange with said extending end portion having an end opening leading to a blind end central bore in said hollow bolt; said apparatus comprising:

a generally cylindrical support body having a central bore therethrough defining a small diameter intermediate bore portion and an enlarged diameter inner end bore portion for fitting on the extending end portion of said bolt in axial alignment therewith with the bore of the body being in fluid communication with the bore of said bolt and forming a continuation thereof;

a tubular fluid transmitting and heat transfer conduit secured to said body within said enlarged diameter end bore portion and defining an annular chamber between said conduit and said body having a vent to atmosphere, said tubular conduit extending within the bore of said hollow bolt for a major portion of the length of said bolt bore and defining an annular space between the conduit and the bolt;

a gas torch for supplying a fired fluid stream to the central bore of said body for flow in one direction through said conduit and discharge from the end of said conduit, then for flow in an opposite direction along the annular space between the conduit and bolt to the annular chamber of said body for venting to atmosphere, said heated fluid and conduit heating said bolt to a sufficient high temperature whereby said bolt is tensioned a predetermined amount by rotation of a nut on said externally threaded end portion to provide a predetermined strain on said bolt; and means for supplying a separate fluid to said central bore for combining with said fired fluid stream.

* * * * *